No. 730,126. Patented June 2, 1903.

UNITED STATES PATENT OFFICE.

ROBERT HUTCHISON, OF PRESTWICK, SCOTLAND.

PROCESS OF MANUFACTURING COMPOSITION FOR GOLF-BALLS, &c.

SPECIFICATION forming part of Letters Patent No. 730,126, dated June 2, 1903.

Application filed September 30, 1902. Serial No. 125,427. (No specimens.)

*To all whom it may concern:*

Be it known that I, ROBERT HUTCHISON, a subject of the King of Great Britain and Ireland, and a resident of Prestwick, in the county of Ayr, Scotland, (whose postal address is Earlston, Prestwick, in the county of Ayr, Scotland,) have invented a certain new and Improved Process of Manufacturing a Composition for Golf-Balls, &c., (for which I have applied for a British patent, No. 11,801, dated May 24, 1902,) of which the following is a specification.

My said invention has for its object to improve the composition and manufacture of golf-balls, so as to increase their resiliency and durability.

In carrying out my invention I employ gutta-percha or balata, which is first hardened by any known process, such as by treatment with naphtha, to extract the resins therein, and to which may be added rubber in such proportion as is required according to the hardness desired in the ball. With the materials so treated I incorporate lime in the proportion of about five per cent., by weight, though this proportion may be varied, the lime being, by preference, slaked to the consistency of a cream and added to the material while the latter is softened by heat, which should not by preference exceed 240° Fahrenheit. The ingredients are masticated together in any suitable known form of masticator until the water is evaporated and leaves a homogeneous mass. This addition of lime increases the dryness and toughness of the material and at the same time gives additional weight to the composition. To the resultant mass thus formed there is added such a percentage of sulfur as, aided by the lime, will vulcanize so much of the material as will give the mass the maximum elasticity obtainable without at the same time reducing its cohesive property below that at which separate pieces while heated preferably to a temperature of from 212° to 230° Fahrenheit can be joined firmly together by pressure. The proportion of sulfur may vary, but one and one-half to two per cent., by weight, will be found to give good results. The vulcanizing process is carried out by subjecting the mass, by preference in the masticator, to frictional heat, whereby the temperature of the mass, which should be by preference below 240° Fahrenheit, is raised locally by the friction. This low temperature for the mass is below that required for the usual process of vulcanizing and has the effect of localizing the action of the sulfur. By this treatment of the mass a composition is obtained which has good cohesive property, great toughness and elasticity, and the composition can be molded in the usual manner into balls, which will be found to possess increased resiliency and durability.

Instead of lime any other substance having similar properties to lime—such, for example, as baryta, strontia, or magnesia—may be employed either partially or wholly in the process, and the order in which the ingredients are added may also be varied.

What I claim as my invention is—

1. The process of manufacturing a composition for golf-balls which consists in treating gutta-percha or balata to remove resins therefrom, adding rubber thereto, softening the materials by heat, incorporating therewith lime, masticating the compound and to the mass thus formed adding sulfur and vulcanizing by frictional heat, so that while the temperature locally is sufficiently high for vulcanization at the same time that of the mass can be kept comparatively low, substantially as set forth.

2. The process of manufacturing a composition for golf-balls which consists in treating gutta-percha or balata to remove resins therefrom, heating the gutta-percha or balata so treated, incorporating lime therewith, and adding sulfur and masticating the resultant mass while at the same time keeping its temperature comparatively low, substantially as set forth.

3. A process of manufacturing a composition for golf-balls consisting in adding lime and sulfur to a mixture of hardened gutta-percha or balata and rubber; and masticating the resultant mass while keeping it at a comparatively low temperature, as and for the purposes herein set forth.

4. A process of manufacturing a composition for golf-balls consisting in treating a mixture of hardened gutta-percha or balata, lime, and sulfur, in a masticator, the mass being kept at a comparatively low temperature substantially as and for the purposes herein set forth.

5. The herein-described process of manufacturing a composition for golf-balls, &c., consisting in adding a substance having the properties of lime, and sulfur, to hardened gutta-percha or balata, at a low temperature, then locally raising the temperature of the mass by the application of friction to cause vulcanization to take place at a low temperature of the mass substantially as described.

6. The process of manufacturing a composition for golf-balls consisting in treating hardened gutta-percha or balata by adding thereto lime to aid in vulcanizing action of sulfur, and then adding sulfur and then masticating, substantially as described.

7. The process herein described of manufacturing a composition for golf-balls, consisting in treating a mixture of hardened gutta-percha or balata and rubber by adding thereto lime to aid in vulcanizing action of sulfur, adding sulfur, and then masticating, substantially as described.

In testimony whereof I have signed my name to this specification in the presence of two subscribing witnesses.

ROBERT HUTCHISON.

Witnesses:
DAVID FERGUSON,
GEORGE PATTERSON.